Dec. 1, 1953   N. J. PORTLANCE   2,660,973
SIMULATED MOTOR
Filed April 24, 1952   2 Sheets-Sheet 1
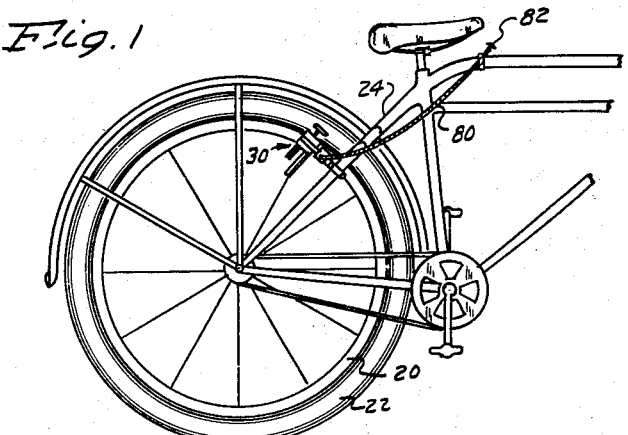
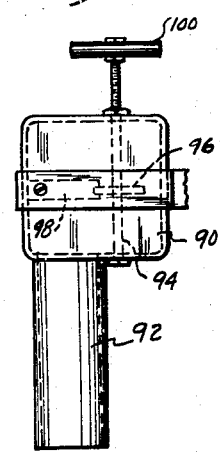
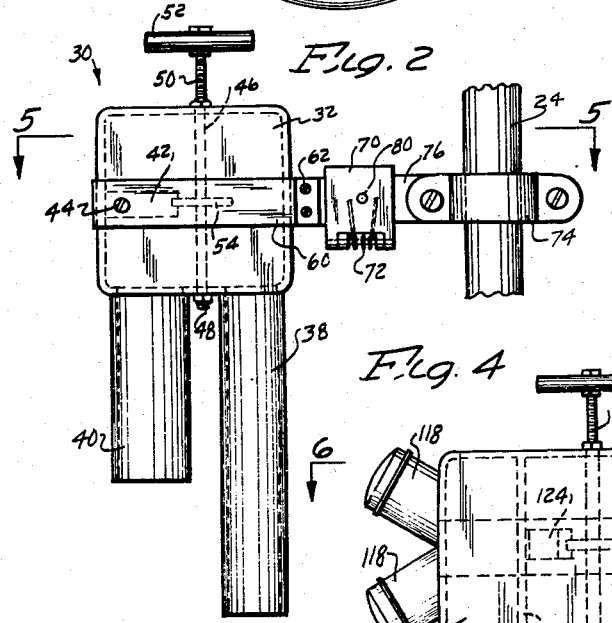
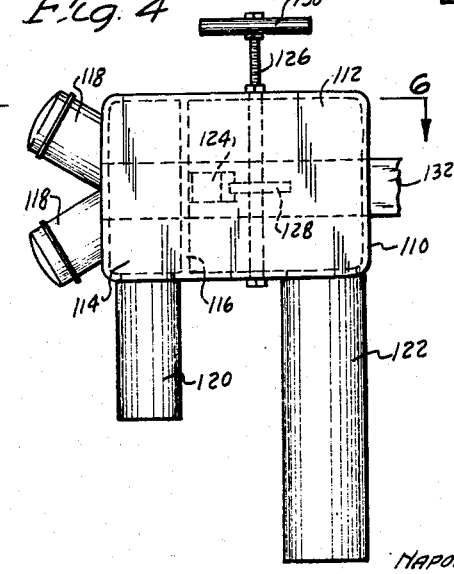
INVENTOR.
NAPOLEAN J. PORTLANCE
BY John L. Woodward
ATTORNEY Dec. 1, 1953 N. J. PORTLANCE 2,660,973
SIMULATED MOTOR
Filed April 24, 1952 2 Sheets-Sheet 2
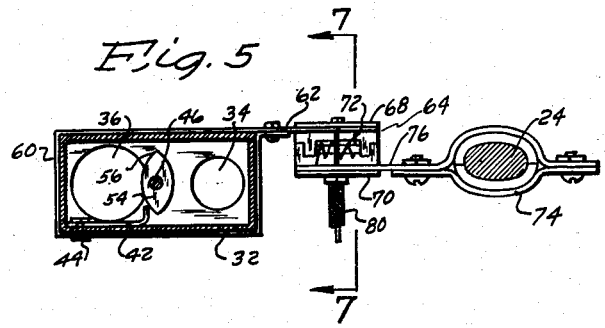
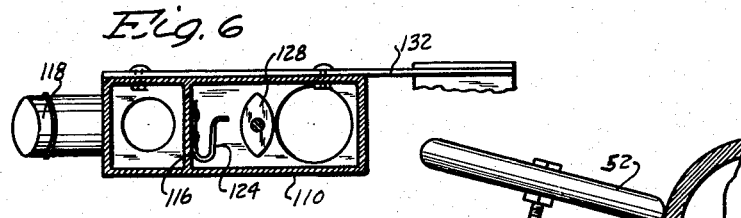
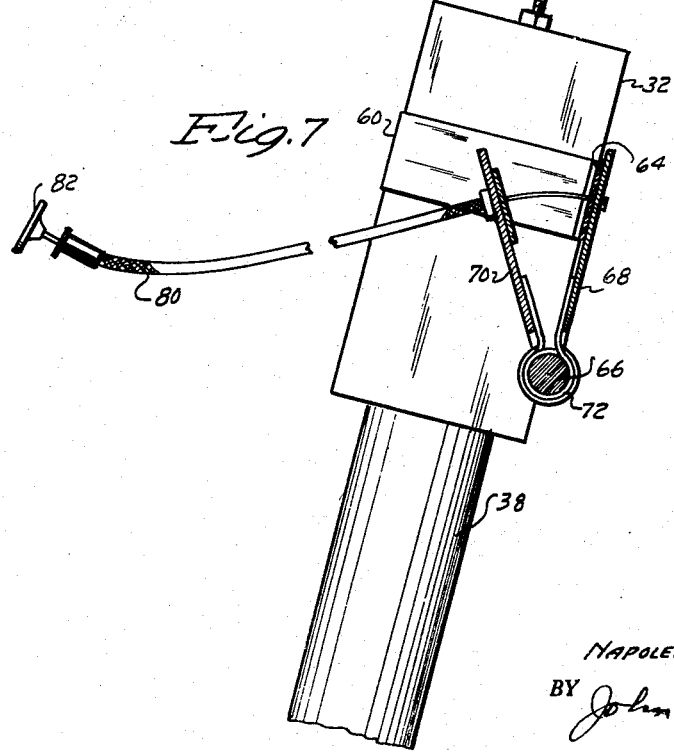
INVENTOR.
NAPOLEON J. PORTLANCE
BY John L. Woodward
ATTORNEY Patented Dec. 1, 1953

2,660,973

UNITED STATES PATENT OFFICE 2,660,973

SIMULATED MOTOR

Napoleon J. Portlance, Minneapolis, Minn.

Application April 24, 1952, Serial No. 284,016

6 Claims. (Cl. 116—56)

This invention relates to a simulated internal combustion engine for use with manually operated vehicles such as bicycles, tricycles etc.

The simulated internal combustion engine of this invention consists of a hollow sound chamber provided with sound outlet means having a vibrator positioned in the sound chamber with vibrator fingers positioned on a rotary shaft for engaging the vibrator and a friction disk on the shaft on the outside of the sound chamber for actuating the shaft.

It is an object of this invention to provide in a simulated internal combustion engine which is operated by the wheel of a bicycle etc., a hollow sound chamber in which a vibrator is mounted and means on a shaft for vibrating the vibrator for producing sound.

It is a further object of this invention to provide a simulated two cylinder internal combustion engine comprising a sound chamber with means in said chamber for producing sound simulating two cylinders of an internal combustion engine and sound outlet means for the sound chamber.

It is a further object of this invention to provide in a simulated internal combustion engine, a sound chamber with means for producing sound therein and means associated with the sound chamber for causing different sound tones.

Other and further objects will become apparent from the following detailed description and the appended claims.

In the accompanying drawings:

Figure 1 is an elevational view of the rear wheel and rear frame of a bicycle disclosing a simulated motor mounted on the frame of the bicycle.

Figure 2 is an elevational view of the simulated engine with the bracket for the simulated engine shown secured to a frame portion of a bicycle.

Figure 3 is an elevational view of a modified form of simulated internal combustion engine.

Figure 4 is another modified form of simulated two cylinder internal combustion engine.

Figure 5 is a horizontal sectional view taken on line 5—5 of Figure 2.

Figure 6 is a horizontal sectional view taken on line 6—6 of Figure 4.

Figure 7 is a front enlarged sectional view taken on line 7—7 of Figure 5 showing the means for moving the engine to operative position with a bicycle tire and from operative position with respect to the bicycle tire.

Referring in detail to the drawings, 20 is the rear wheel of a bicycle with a pneumatic tire 22 mounted thereon. The simulated internal combustion engine 30 is appropriately mounted to an arm 24 of the bicycle frame.

The simulated internal combustion engine 30 consists of a hollow chamber or casing 32 of rectangular shape. The chamber 32 may be formed of any metal, plastic or any other suitable material. One side of the chamber 32 is preferably detachable so that the device may be readily repaired. A pair of circular openings 34 and 36 are formed in the bottom of the hollow casing 32, with opening 36 being larger in diameter than opening 34. Hollow cylindrically shaped casings 38 and 40 being open at both ends are secured in the openings 34 and 36 respectively. The hollow casings 38 and 40 are substantially the same diameter as the openings 34 and 36 respectively thereby providing sound outlet means with different size openings.

An angular metal leaf 42 is secured by screw and bolt means 44 to one of the inside walls of the hollow chamber 32. A rotary rod of shaft 46 is mounted to extend vertically through the hollow chamber 32. The lower end of rod 46 passes through an aperture in the bottom wall of the chamber 32 with a nut 48 screwed on a thread portion of rod 46 projecting below the bottom wall of the chamber 32. The upper end 50 of the rod 46 projects considerably beyond the upper wall of the chamber 32. A nut is threaded on the upper end of the rod portion 50 and is screwed downwardly to engage the upper wall of the chamber 32 to hold the rod 46 in operative position in chamber 32. A friction disk 52 is fixedly mounted on the outer end of the rod portion 50. A body element 54 provided with a pair of diametrically opposed pointed fingers 56 is mounted on the rod 46 inside the hollow chamber 32 and the pointed fingers 56 engage the vibrator 42 when the rod 46 is rotated thus producing sounds in the hollow chamber 32.

A metal band 60 is secured around the outside of the two ends and two side walls intermediate their top and bottom edges with one end of the band 60 secured adjacent the other end of the band 60 as at 62 by nut and screw means. The other end of the metal band 60 extends beyond one of the end walls of the hollow chamber 32 as at 64. A U-shaped leg 68 is mounted on a pivot pin 66. The upper portion of leg 68 is fixedly secured to the extention 64 of band 60 as by soldering etc. and a second U-shaped leg 70 is pivotally mounted on the pin 66 with the sides of leg 70 capable of being housed inside the sides of leg 68. A coil spring 72 is mounted on pin 66 between the sides of legs 68 and 70 with the opposite ends of the spring 72 in engagement with the inside rear portion of legs 68 and 70 respectively. A removable bracket 74 is adapted to be mounted on the arm 24 of the bicycle frame with an extension 76 of the bracket 74 appropriately fastened to the pivotal leg 70.

An operable means for moving the chamber 32 and its friction disk 52 from engagement with the tire 22 of the bicycle wheel 20 consists of wire 80 with one end threaded through an aperture in leg 70 and being secured to the stationary leg 68. A handle 82 for the wire 80 is mounted adjacent the saddle of the bicycle.

The coil spring 72 normally urges the hollow chamber 32 toward the tire 22 thus holding the friction disk 52 in engagement with the tire 22. The rotation of the tire 22 imparts motion to the disk 52 which rotates the rod 46 and the rotating rod 46 moves the pointed fingers 56 of the mounted element 54 into contact with the vibrator 42 in the hollow chamber 32 thus producing sound in the chamber 32. The sound outlets 38 and 40 permits the sound to emit from the sound chamber 32. The two fingers 56 being 180 degrees apart are designed to simulate a two cylinder internal combustion engine. The different sizes of the outlet means 38 and 40 for chamber 32 produces different sound tones. The faster the wheel 20 rotates disk 52 the faster the rod 46 moves the fingers 56 into engagement with vibrator 42 thus producing more sounds in the sound chamber 32. When it is desired to disengage the disk 52 from the tire 22, then pull up on wire 80 and the disk 52 is moved from engagement with the tire 22. When the wire 80 is released, coiled spring 72 moves the chamber 32 toward the tire 22 until the disk 52 again engages the tire 22.

Figure 3 discloses a smaller sized sound chamber 90 for use with wheels of a tricycle. The sound chamber 90 is provided with an opening in its bottom wall and a hollow cylindrically shaped casing 92 is positioned in the opening which projects beyond the sound chamber 90 providing a sound outlet. A rotary shaft 94 is mounted inside the chamber 90 with an element 96 having a pair of pointed fingers spaced 180 degrees apart from each other similar to fingers 56 of element 54 carried on the shaft inside the chamber 90 for engaging a vibrator 98 positioned in hollow chamber 90. A friction disk 100 is mounted on a portion of rod 94 projecting above chamber 90 for actuating rod 94.

Figures 4 and 6 disclose another modification of the simulated internal combustion engine. A hollow sound chamber 110 is divided into two compartments 112 and 114 by a partition wall 116. Compartment 112 is larger than compartment 114. A pair of protuberances 118 are formed on the chamber 110 simulating cylinders of an internal combustion engine. An opening is formed in the bottom of chamber 110 communicating with compartment 114 and a hollow tube 120 is positioned in the opening for compartment 114 providing a sound outlet therefor. A larger opening communicates with compartment 112 and a hollow tube 122 is positioned in the larger opening for the compartment 112 providing a sound outlet for such compartment. A vibrator 124 is secured to wall 116 inside compartment 112. A rotary rod 126 carries an element 128 with fingers similar to the fingers on elements 54 and 96 for engaging the vibrator 124. A friction disk 130 is on the top of rod 126 which projects outside chamber 110. A band 132 secured to chamber 110 is associated with a mounting means similar to the mounting means for chamber 32 of Figures 1 and 2.

The simulated internal combustion engine 110 will produce different sound tones when the fingers of element 128 strikes the vibrator 124 because of the different size sound chambers and sound outlet means.

Other changes in form, proportion and minor changes in form and details of construction may be resorted to without departing from the spirit of the invention or scope of the appended claims.

Having thus described my invention, what is claimed as new is:

1. In a simulated motor for bicycles comprising hollow sound chamber means provided with a pair of spaced openings, one of the openings being larger than the other opening, a first hollow tubular member substantially similar in diameter with the small opening in the sound chamber positioned in the small opening projecting from the sound chamber providing a sound outlet, a second hollow tubular member having substantially the same diameter as the larger opening positioned in the larger opening and projecting from the sound chamber providing a second sound outlet, the second hollow tubular member being of greater length than the first tubular member, a vibrator mounted inside the chamber, a rotary shaft mounted in the chamber with a portion of the shaft extending outside the chamber, a friction disk on the extending portion of the shaft for actuating said shaft, and vibrator fingers mounted on the shaft inside the chamber for engaging the vibrator, and when the vibrator fingers engage the vibrator different sound tones are produced by the simulated motor.

2. In a simulated two cylinder motor for bicycles comprising a hollow casing, a partition wall positioned inside the casing intermediate its ends forming a pair of sound chambers, each of the chambers provided with an opening, a hollow member positioned in each of the openings projecting outside the sound chambers providing a sound outlet means for each chamber, a vibrator mounted in one of the sound chambers, a rotary shaft mounted inside the said one sound chamber with a portion projecting outside the said one sound chamber, a friction disk on the projecting portion of the shaft for actuating said shaft, and vibrator finger means on the shaft inside the chamber for engaging the vibrator for producing different sound tones.

3. In a simulated motor for bicycles as described in claim 2 wherein one of the sound chambers is larger than the other of said sound chambers.

4. In a simulated two cylinder motor for bicycles comprising a hollow casing, a partition wall positioned inside the casing intermediate its ends forming a pair of sound chambers, each of the chambers provided with an opening, a hollow member positioned in each of the openings projecting outside the sound chambers providing a sound outlet means for each chamber, a vibrator mounted in one of the sound chambers, a rotary shaft mounted inside the said one sound chamber with a portion projecting outside the said one sound chamber, a friction disk on the projecting portion of the shaft for actuating said shaft, and vibrator finger means on the shaft inside the chamber for engaging the vibrator for producing different sound tones, wherein one of the hollow sound outlet members is longer than the other of the sound outlet members.

5. In a simulated motor for bicycles as described in claim 4 wherein one of the sound chambers is larger than other of the sound chambers, one of the sound outlet members being longer than the other sound outlet members, the longer sound outlet members communicating with the larger sound chamber, the shorter sound outlet means communicating with the smaller sound chamber.

6. In a simulated motor for bicycles as described in claim 4 wherein the one sound outlet member is of larger diameter and longer than the other sound outlet member.

NAPOLEON J. PORTLANCE.

References Cited in the file of this patent

UNITED STATES PATENTS

| Number | Name | Date |
| --- | --- | --- |
| 1,009,885 | Barg | Nov. 28, 1911 |
| 2,609,640 | Newell | Sept. 9, 1952 |